United States Patent [19]

Evans

[11] 3,724,871
[45] Apr. 3, 1973

[54] MUD FLAPS

[76] Inventor: James P. Evans, 3233 Southwest 23rd Street, Oklahoma City, Okla.

[22] Filed: Apr. 14, 1971

[21] Appl. No.: 133,832

[52] U.S. Cl. ..........................................280/154.5 R
[51] Int. Cl. ................................................B62d 25/16
[58] Field of Search...........280/154.5 R, 152; 298/15

[56] References Cited

UNITED STATES PATENTS

| | | | |
|---|---|---|---|
| 3,027,178 | 3/1962 | Eaves | 280/154.5 R |
| 3,089,712 | 5/1963 | Kosik | 280/154.5 R |
| 2,619,363 | 11/1952 | Wenham | 280/154.5 R |
| 3,051,508 | 8/1962 | Federspiel | 280/154.5 R |

Primary Examiner—Leo Friaglia
Assistant Examiner—Robert R. Song
Attorney—Dunlap, Laney, Hessin & Dougherty

[57] ABSTRACT

A mud flap device which is particularly adapted for use with truck trailers, the device consisting of a longitudinally reinforced guard member which includes securing means across the top edge thereof and, further, which is formed with a forwardly protruding portion for alignment generally with a vehicle tire such that the protruding portion of the guard member will maintain the lower portion of the guard member displaced by a predetermined amount from the tire.

8 Claims, 6 Drawing Figures

PATENTED APR 3 1973 3,724,871

INVENTOR
JAMES P. EVANS

BY
Dunlap, Laney, Hessin & Dougherty
ATTORNEYS

MUD FLAPS

BACKGROUND OF THE INVENTION

1. Field of the Invention

The invention relates generally to mud flap accessories and, particularly, but not by way of limitation, it relates to improvements in suspended mud guard members as employed on trucks and semi-trailers.

2. Description of the Prior Art

The prior art includes many and varied forms of mud guard devices which embody all manner of features ranging from air directing flow vanes to mechanically movable parts or components which are intended to operate in a manner which improves the function of the device. It is well-known to reinforce mud guard devices by whatever means in order to bring about an anti-sail quality, and this can be very important to roadway performance as some states have legislative regulation relative to the types and requirements of truck trailer mud guards. While, as stated, there are diverse types of guard available, there has yet to be proposed a type of guard which offers any longevity of usage as applied on general freight hauling vehicles, the replacement rate of mud guards in this instance being extremely high.

SUMMARY OF THE INVENTION

The present invention contemplates a mud guard device which may be secured to the vehicle to extend down behind the vehicle wheel in such a manner that it is effective to block flying stones, spray, and mud, as well as to avoid tearing of the mud guard by the vehicle wheel itself. In a more limited aspect, the invention consists of a mud guard member which is relatively flexible but reinforced, and which includes a forwardly protruding portion generally aligned with the vertical center of the vehicle wheel, such forward protrusion serving to maintain the lower portion of the mud guard at greater than a minimum distance behind the vehicle tire.

Therefore, it is an object of the present invention to provide an improved mud guard having longer life expectancy when applied in truck and semi-trailer applications.

It is also an object of the present invention to provide an apparatus which performs the mud guard function and fulfills all known state regulation requirements as to height and effectiveness without the danger of interfering with the truck wheels when approaching dock blocks, curbs, etc.

It is still further an object of the invention to provide an anti-sail mud guard device capable of long term usage without the usual disadvantages of tearing, bending or being generally reduced to an ineffective status.

Finally, it is an object of the present invention to provide truck trailer mud flaps offering much increased economy through extension of endurance and reliability at the comparable original cost.

Other objects and advantages of the invention will be evident in the following detailed description when read in conjunction with the accompanying drawings which illustrate the invention.

DETAILED DESCRIPTION OF THE PREFERRED EMBODIMENT

Figures 1, 2:
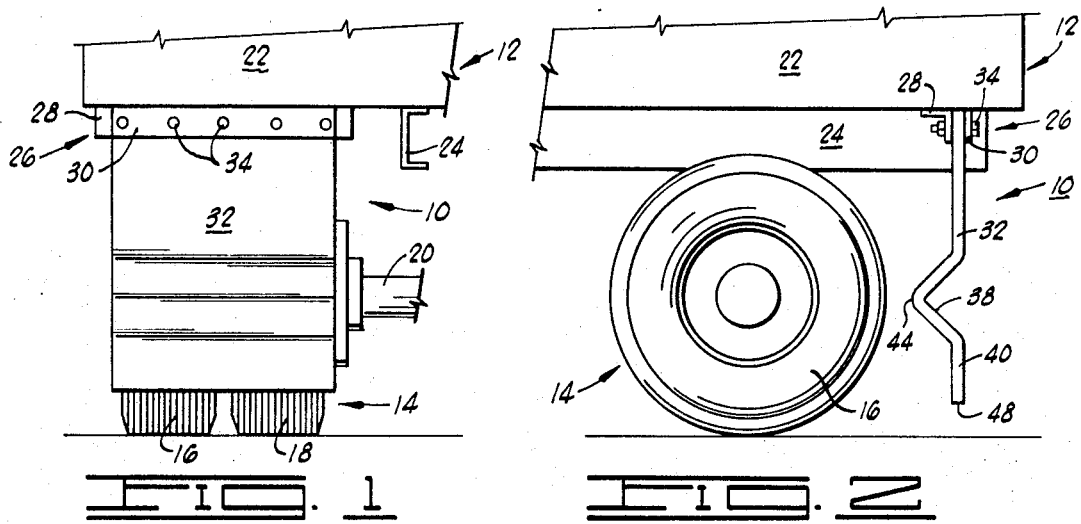
FIG. 1 is a rear elevation of a mud flap constructed in accordance with the present invention.
FIG. 2 is a side elevation of the mud flap and truck wheels of FIG. 1.

Referring now to FIG. 1, a mud flap assembly 10 is shown as installed on such as a truck semi-trailer 12 having the usual dual wheel assembly 14, i.e., wheels 16 and 18, and a center axle 20. The mud flap assembly 10 is secured by a suitable fastening means beneath a body portion 22 of semi-trailer 12 adjacent to a member 24. While a fastening bracket 26 may consist of various forms, including the stress breakaway types, the present invention is described with respect to a bracket of the type which consists of an angle member 28 secured as by welding to the underside of the trailer body 22 for interaction with a clamping bar 30.

A mud flap 32 is then secured beneath semi-trailer body 22 as it is secured between angle member 28 and clamping bar 30 and securely fastened by a plurality of fasteners 34 which maintain the clamping assembly 26 in tight seizure. There are various forms of clamping assembly 26 which may be utilized and, as previously mentioned, a type known as the stress breakaway holder has become increasingly popular as of late. However, it may be noted too that the design of mud flaps in accordance with the present invention will obviate the necessity for a breakaway type of flap or guard structure, as will be further described below.

Referring now to FIG. 2, it can be noted that the mud flap 32 consists of a rectangular expanse of relatively resilient material formed as an upper portion 36, a forward protrusion portion 38, and a lower portion 40. One or more vertically aligned reinforcing rods or straps, in this case three such straps 42, may be imbedded within the mud flap 32 along it's vertical length. The reinforcing straps may be formed from such as eight gauge steel strapstock which is actually molded into or imbedded within the rubber or other such resilient material making up the mud flap 32.

Figures 3, 4, 5:
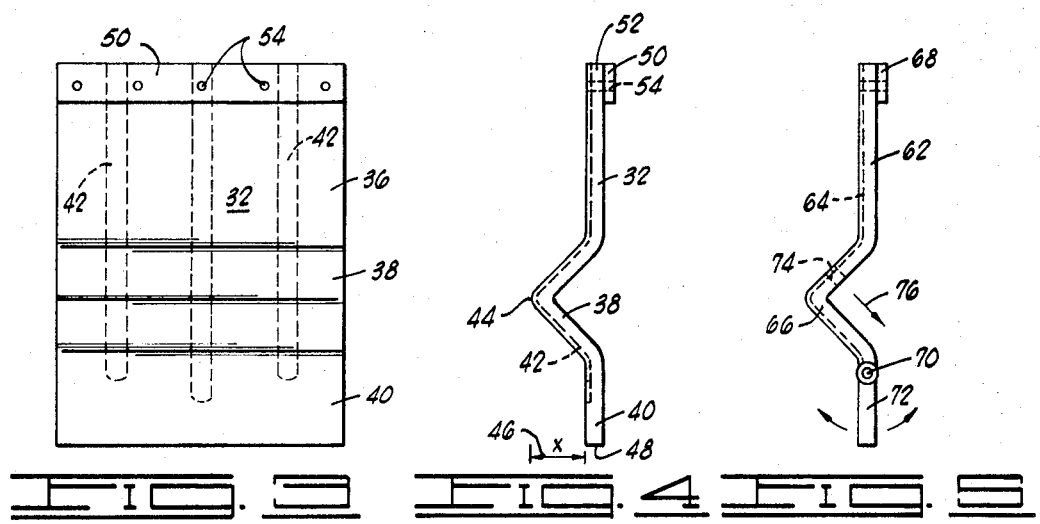
FIG. 3 is a rear elevation of the mud flap of FIG. 1 with internal components shown in dash-lines.
FIG. 4 is a side view of the mud flap shown in FIG. 3.
FIG. 5 is a side view of an alternative form of mud flap embodying the present invention.

The forward protrusion 38 may be such as a right angle bend as shown in FIG. 4. Thus, protrusion 38 may be formed as a 45° – 90° – 45° series of bends made transversely across the mud flap 32. Actually, any manner of bending or contorting may be acceptible so long as mud flap 32 can extend a contact portion or leading edge 44 by at least a given distance $x$ (see arrow 46) forward from the general vertical plane of mud flap 32. The distance $x$ will be determined as a function of the height of the bottom edge 48 above the pavement or ground surface, i.e., directly porportional to its likelihood of getting caught between the rear wheels and docking blocks during dock loading manuevering of the truck.

The upper end of the mud flap 32 may be formed with a resilient form of reinforcing liner such as stiff rubber, plastic or other elastomeric substance, reinforcing element 50 being suitably bonded across upper edge 52 of mud flap 32. The plurality of securing holes 54 are then formed through upper end 52 of mud flap 32 and reinforcing section 50, each serving to receive the fasteners 34 therethrough for the purpose of securing the mud flap 32 in the bracket assembly 26.

In operation, the mud flap 32 will serve to trail closely behind the dual wheels 14 thereby to block all flying stone, mud and splashing water. Mud flap 32 is given an essentially anti-sail characteristic by means of the reinforcing straps 42 and, in addition, a forward protrusion 38 having leading edge 44 serves to guard against the possibility of the lower portion 40 of mud flap 32 getting caught beneath either of tires 16 or 18 when backing over dock securing blocks. This is a particular hazzard and results in rapid weakening and destruction of most conventional types of mud flaps, and the coaction of protrusion 38 and leading edge 44 with the dual wheel assembly 14 prevents the lower end portion 40 and its lower edge 48 from getting into a shearing bind adjacent the securing blocks.

Contact of the leading edge 44 with the rear edge of tires 16 and 18 will always assure that the vertical plane of mud flap 32, or that plane wherein lower portion 40 would lie, will always be displaced sufficiently behind the tires 16 and 18 so that there can be no binding or tearing. Thus, no matter what the overall length of mud flap 32, and even in cases where the lower edge 48 is very close to the ground, as per some state regulations, the mud flap 32 will always be moved sufficiently over a securing block prior to the time that the backing dual wheel assembly 14 can arrive thereat. It should be noted that while FIG. 2 shows leading edge 44 adjacent to the vertical mid-point of dual wheels 16 and 18, this is not particularly critical and may be varied up or down to some degree. It may very often occur that the standard sized mud flap 32 will vary in vertical positioning about the wheel mid-point of the dual wheel assembly 14 due to differences in height of various types and makes of trailers.

FIG. 5 illustrates an alternative form of the invention wherein several added features are combined. Thus, a mud flap 62 may be formed with one or more vertical reinforcing straps 64 to include a transverse bend defining a forward protrusion 66 similar to that shown in the embodiment of FIGS. 1 – 4. The mud flap 62 is suitably formed with a securing edge 68 across the top while a hinge member 70 is secured transversely across the mud flap 62 just below the forward protrusion 66. The hinge 70 may be suitably secured as by integral bonding, or mechanical fastening with the lower edges of reinforcing strap 64, and hinge 70 serves to provide a movable affixure for lower flap portion 72 which is also suitably bonded to hinge 70.

The use of the hinge 70 and lower flap portion 72 may serve to enable still greater freedom of movement of the lower flap portion 72 relative to the upper portion of mud flap 62 and the forward protrusion 66. One or more venting holes 74 may be formed through the upper slope of forward protrusion 66 for the purpose of directing a stream of air, as shown by arrow 76, down along the rear side of mud flap 62 to enhance its anti-sail capabilities.

Figure 6:
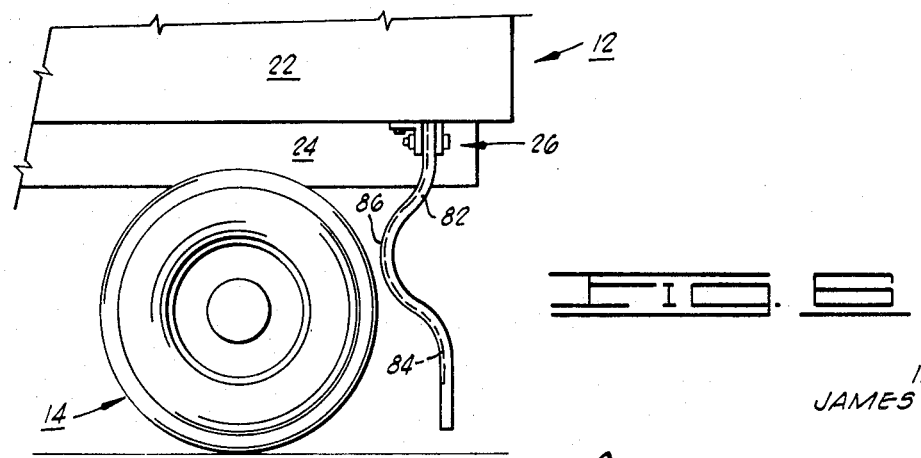
FIG. 6 is yet another alternative form of mud flap constructed in accordance with the present teachings.

The illustration of FIG. 6 depicts still another alternative form of mud flap 82 which is made rigid by one or more vertically extending reinforcing straps 84 suitably bonded or imbedded within the flap material. In this case, a forward protrusion 86 is actually formed as a rounded configuration departing in the forward direction from the general vertical plane of mud flap 82. Thus, mud flap 82 will still have the capability of raising the lower end of mud flap 82 at a certain distance rearward of dual wheel assembly 14 thereby to protect against any binding contact between the dual wheel assembly 14 and any dock securing blocks or the like which are generally disposed about the loading yard.

The actual material used in the mud flaps need not be varied from the usual and the accepted compounds, i.e., molded rubber, rubberized binder materials, various plastics, etc., and it is contemplated that in some cases greater strength and versatility might be afforded by utilizing such as vertically aligned mesh chain strands bonded within a suitable rubberized binder. The many facets of advantageous selection of materials, fastening techniques and the like may all be combined with the essential teachings of the present invention to afford a mud flap capable of optimum function for every exigency.

Changes may be made in the combination and arrangement of elements as heretofore set forth in this specification and shown in the drawings; it being understood that changes may be made in the embodiments disclosed without departing from the spirit or the scope of the invention as defined in the following claims.

What is claimed is:

1. An improved mud flap device for affixure to a vehicle to be suspended behind the vehicle wheels, comprising:
   flap means formed unitarily from bendable material and shaped to include a substantially vertical upper planar expanse, a forward protruding portion forming a leading edge disposed transversely of the flap means and maintained ahead of the general vertical plane of said flap means in close proximity to the vehicle wheel, and a lower portion disposed in the same plane as said upper planar expanse; and stiffening means secured to said flap means which is shaped to retain said forward protruding portion in desired configuration.

2. An improved mud flap as set forth in claim 1 wherein said stiffening means comprises:
   one or more steel reinforcing straps secured to said flap means and vertically aligned.

3. An improved mud flap as set forth in claim 1 wherein said stiffening means comprises:
   one or more steel reinforcing straps each aligned in the vertical dimension and imbedded within said flap means bendable material.

4. An improved mud flap device as set forth in claim 2 which is further characterized in that:
   said forward protruding configuration is formed as a 45° – 90° – 45° series of bends to form the protrusion transversely across the vertically hanging mud flap.

5. An improved mud flap device as set forth in claim 2 which is further characterized in that:
   said forward protruding configuration is formed as a smoothly arcuate bend thereby to form said horizontal transverse protrusion.

6. An improved mud flap device as set forth in claim 4 which is further characterized to include:
   hinge means connected transversely across said mud flap just below and parallel to said protrusion thereby to allow the lower portion of said flap means to hang in free-swinging manner.

7. An improved mud flap device as set forth in claim 2 which is further characterized in that:
   said clap means protruding configuration is formed with one or more venting holes through the upper part thereof to effect anti-sail stabilization of the lower portion of said flap means.

8. An improved flap device as set forth in claim 6 which is further characterized in that:
   said flap means protruding configuration is formed with one or more venting holes through the upper part thereof to effect anti-sail stabilization of the lower portion of said flap means.

* * * * *